(12) United States Patent
Iwatani

(10) Patent No.: US 7,103,653 B2
(45) Date of Patent: Sep. 5, 2006

(54) STORAGE AREA NETWORK MANAGEMENT SYSTEM, METHOD, AND COMPUTER-READABLE MEDIUM

(75) Inventor: Sawao Iwatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 09/779,844

(22) Filed: Feb. 9, 2001

(65) Prior Publication Data
US 2001/0054093 A1 Dec. 20, 2001

(30) Foreign Application Priority Data
Jun. 5, 2000 (JP) ............................. 2000-167482

(51) Int. Cl.
*G06F 15/173* (2006.01)
(52) U.S. Cl. .................... 709/223; 709/213; 709/206
(58) Field of Classification Search ................ 709/223, 709/213, 218, 221, 249, 200, 227, 206, 214, 709/231, 232, 246, 238, 239; 370/254, 352; 710/36, 105; 713/201; 714/6; 700/5; 711/114, 711/6
See application file for complete search history.

(56) References Cited

U.S. PATENT DOCUMENTS

| | | | | |
|---|---|---|---|---|
| 5,297,262 | A * | 3/1994 | Cox et al. ................ | 710/36 |
| 5,544,319 | A * | 8/1996 | Acton et al. ............. | 709/246 |
| 5,604,862 | A * | 2/1997 | Midgely et al. .......... | 714/6 |
| 5,617,537 | A * | 4/1997 | Yamada et al. ........... | 709/214 |
| 5,734,709 | A * | 3/1998 | DeWitt et al. ........... | 379/221.15 |
| 5,757,642 | A * | 5/1998 | Jones ..................... | 700/5 |
| 5,961,607 | A * | 10/1999 | Schaefers ................ | 709/249 |
| 6,023,730 | A * | 2/2000 | Tani ...................... | 709/231 |
| 6,044,405 | A * | 3/2000 | Driscoll et al. ......... | 709/232 |
| 6,070,243 | A * | 5/2000 | See et al. ................ | 713/201 |
| 6,184,823 | B1 * | 2/2001 | Smith et al. ............. | 342/357.13 |
| 6,292,747 | B1 * | 9/2001 | Amro et al. .............. | 701/213 |
| 6,321,158 | B1 * | 11/2001 | DeLorme et al. .......... | 701/201 |
| 6,360,255 | B1 * | 3/2002 | McCormack et al. ........ | 709/221 |
| 6,363,065 | B1 * | 3/2002 | Thornton et al. ......... | 370/352 |

(Continued)

FOREIGN PATENT DOCUMENTS

JP 07-281959 10/1995

(Continued)

OTHER PUBLICATIONS

Proposal: www.cc.gatech.edu/fce/cybernet/proposal.html.*

(Continued)

*Primary Examiner*—Thong Vu
*Assistant Examiner*—Susan Ford
(74) *Attorney, Agent, or Firm*—Staas & Halsey LLP

(57) ABSTRACT

An integrated management mechanism of a storage area network (SAN) integrates and manages a traditionally dispersed security system from a single source and automates security management in the SAN. The integrated management mechanism integrates and manages the SAN, and is configured so that access relationships of the host computers and the storage devices of the SAN are managed using the integrated management mechanism. An access path on the integrated management mechanism, including a region of the storage devices to which access is attempted from the host computer, the fiber channel adapters used when accessing that storage, and the host bus adapters (HBA) are configured. Based on the access path information configured, the integrated management mechanism establishes respective storage settings, zoning settings, and accessible region permissions for a SAN management mechanism of the host computer, a zoning settings mechanism of the switch, and a storage management mechanism of the storage device.

24 Claims, 9 Drawing Sheets

U.S. PATENT DOCUMENTS

| | | | |
|---|---|---|---|
| 6,370,571 B1* | 4/2002 | Medin, Jr. | 709/218 |
| 6,419,577 B1* | 7/2002 | Okada et al. | 463/1 |
| 6,421,711 B1* | 7/2002 | Blumenau et al. | 709/213 |
| 6,438,591 B1* | 8/2002 | Fehskens et al. | 709/223 |
| 6,505,254 B1* | 1/2003 | Johnson et al. | 709/239 |
| 6,564,274 B1* | 5/2003 | Heath et al. | 710/105 |
| 6,574,655 B1* | 6/2003 | Libert et al. | 709/200 |
| 6,606,706 B1* | 8/2003 | Li | 713/162 |
| 6,611,872 B1* | 8/2003 | McCanne | 709/238 |
| 6,615,313 B1 | 9/2003 | Kato et al. | |
| 6,640,278 B1* | 10/2003 | Nolan et al. | 711/6 |
| 6,745,243 B1* | 6/2004 | Squire et al. | 709/227 |
| 6,834,326 B1* | 12/2004 | Wang et al. | 711/114 |
| 7,024,474 B1* | 4/2006 | Clubb et al. | 709/223 |
| 2001/0049799 A1 | 12/2001 | Morita et al. | |
| 2003/0046347 A1* | 3/2003 | Nishimura | 709/206 |
| 2003/0055929 A1* | 3/2003 | Ding et al. | 709/223 |
| 2003/0120955 A1* | 6/2003 | Bartal et al. | 713/201 |
| 2003/0126221 A1* | 7/2003 | Tanaka et al. | 709/206 |
| 2006/0059253 A1* | 3/2006 | Goodman et al. | 709/223 |

FOREIGN PATENT DOCUMENTS

| | | |
|---|---|---|
| JP | 08-087450 | 4/1996 |
| JP | 10-074129 | 3/1998 |

OTHER PUBLICATIONS

Innovative Integration SCSI4X Hardware/Software Manual; www.innovative-dsp.com/support/manuals/scsi4xman.pdf.*

CCJ Proposal (Draft); rikweb.rhic.bnl.gov/ccj/doc/plan.*

Proposal to Establish the Northern Virginia Metacomputing Center; www.galaxy.gmu.edu/meta/metacomp.html.*

A Visual Approach To Distributed Programming—Ng, Kramer, Magee, Dulay (1996) dse.doc.ic.ac.uk/dse-papers/design/kluwer.ps.gz.*

Pipelined Multi-Queue Management in a VLSI ATM..—Kornaros.. (1997) www.ccsf.caltech.edu/~markatos/avg/papers/1997.ARVLSI.Pipe_MultiQueue.ps.gz.*

Integration of SNMP into a CORBA- and Web-based.. —Aschemann, Mohr, Ruppert (1999) www.isa.informatik.tu-darmstadt.de/VS/Publikationen/papers/kivs99-cosnmpgw.ps.gz.*

ODB-Tools: a description logics based tool for..—Bergamaschi.. sparc20.dsi.unimo.it/prototipo/paperaiia97.ps.gz.*

Payload Caching: High-Speed Data Forwarding for Network.—Yocum, Chase (2000) www.cs.duke.edu/ari/publications/pcache.ps.*

Declarative Languages for Querying Portal Catalogs—Christophides, Plexousakis, .. (2000) www.ercim.org/publication/ws-proceedings/DelNoe01/21_Vassilis.pdf.*

Supporting reduced location management overhead and fault tolerance in Mobile-IP systems Omar, H.; Saadawi, T.; Lee, M.; Computers and Communications, 1999. Proceedings. IEEE International Symposium on Jul. 6-8, 1999 pp. 347-353.*

A route optimization algorithm and its application to mobile location management in ATM networks Dommety, G.; Veeraraghavan, M.; Singhal, M.; Selected Areas in Communications, IEEE Journal on vol. 16, Issue 6, Aug. 1998 pp. 890-908.*

Scalable unidirectional routing with zone routing protocol (ZRP) extensions for mobile ad-hoc networks Sinha, P.; Krishnamurthy, S.V.; Dao, S.; Wireless Communications and Networking Conference, 2000. WCNC. 2000 IEEE vol. 3, Sep. 23-28, 2000 pp. 1329-1339 vol. 3.*

A position-based multi-zone routing protocol for wide area mobile ad-hoc networks Amouris, K.N.; Papavassiliou, S.; Miao Li; Vehicular Technology Conference, 1999 IEEE 49th vol. 2, May 16-20, 1999 pp. 1365-1369 vol. 2.*

* cited by examiner

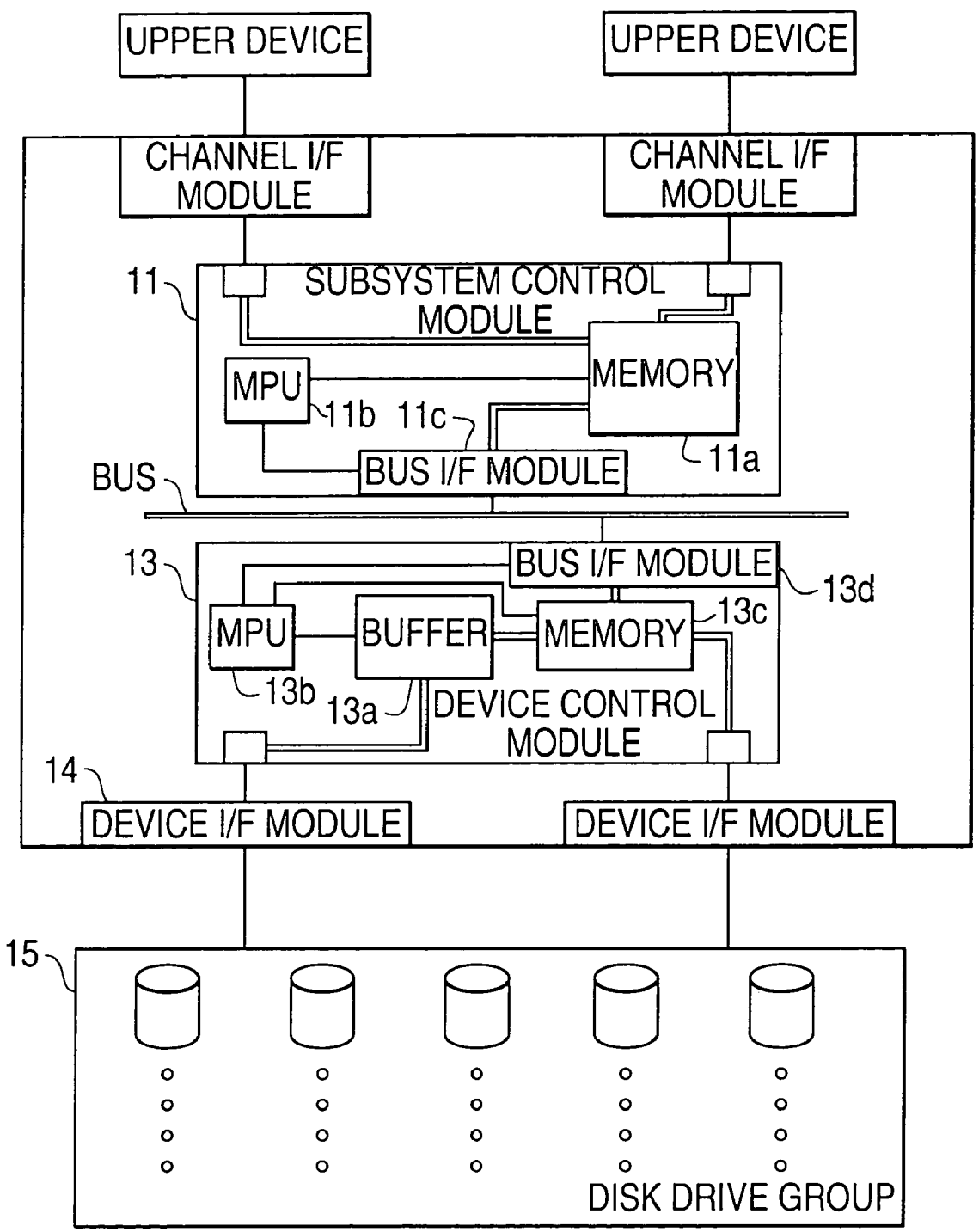

FIG. 5(a)
ACCESS PATH SETTINGS INFORMATION IN
THE SAN INTEGRATED MANAGEMENT MECHANISM

| ACCESS PATH | HOST | HBA(WWN,PID) | STORAGE DEVICE | FCA (WWN,PID) | REGION |
|---|---|---|---|---|---|
| 600 | 110 | 111 (WWNa, PIDa) | 410 | 411 (WWNc, PIDc) | 415 |
| 601 | 120 | 121 (WWNa, PIDa) | 410 | 412 (WWNd, PIDd) | 416 |

FIG. 5(b)
STORAGE AFFINITY TABLE (FOR HOST 110)

| HBA | ACCESS DESTINATION FCA INFORMATION | FCA SUBORDINATE ACCESS REGIONS |
|---|---|---|
| 111 | WWNc | 415 |
| 112 | NONE | NONE |

FIG. 5(c)
SWITCH ZONING TABLE (FOR SWITCH 300)

| ZONE NAME | ZONING SETTINGS |
|---|---|
| A | WWN a, WWN c |
| B | WWN e, WWN d |

FIG. 5(d)
HOST AFFINITY TABLE (FOR STORAGE 410)

| FCA | ACCESSIBLE HBA INFORMATION | CORRESPONDING REGION |
|---|---|---|
| 411 | WWN a | 415 |
| 412 | WWN e | 416 |

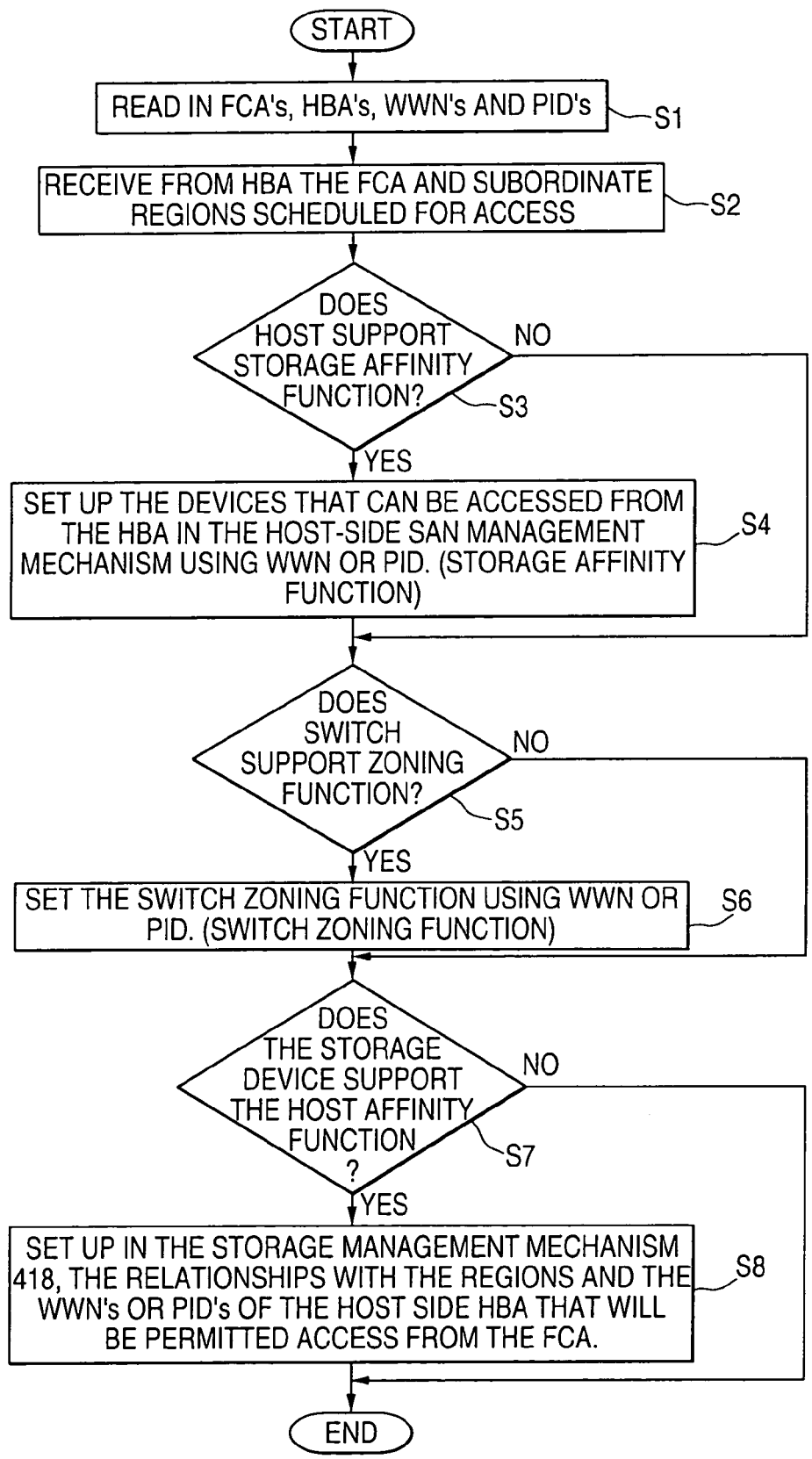

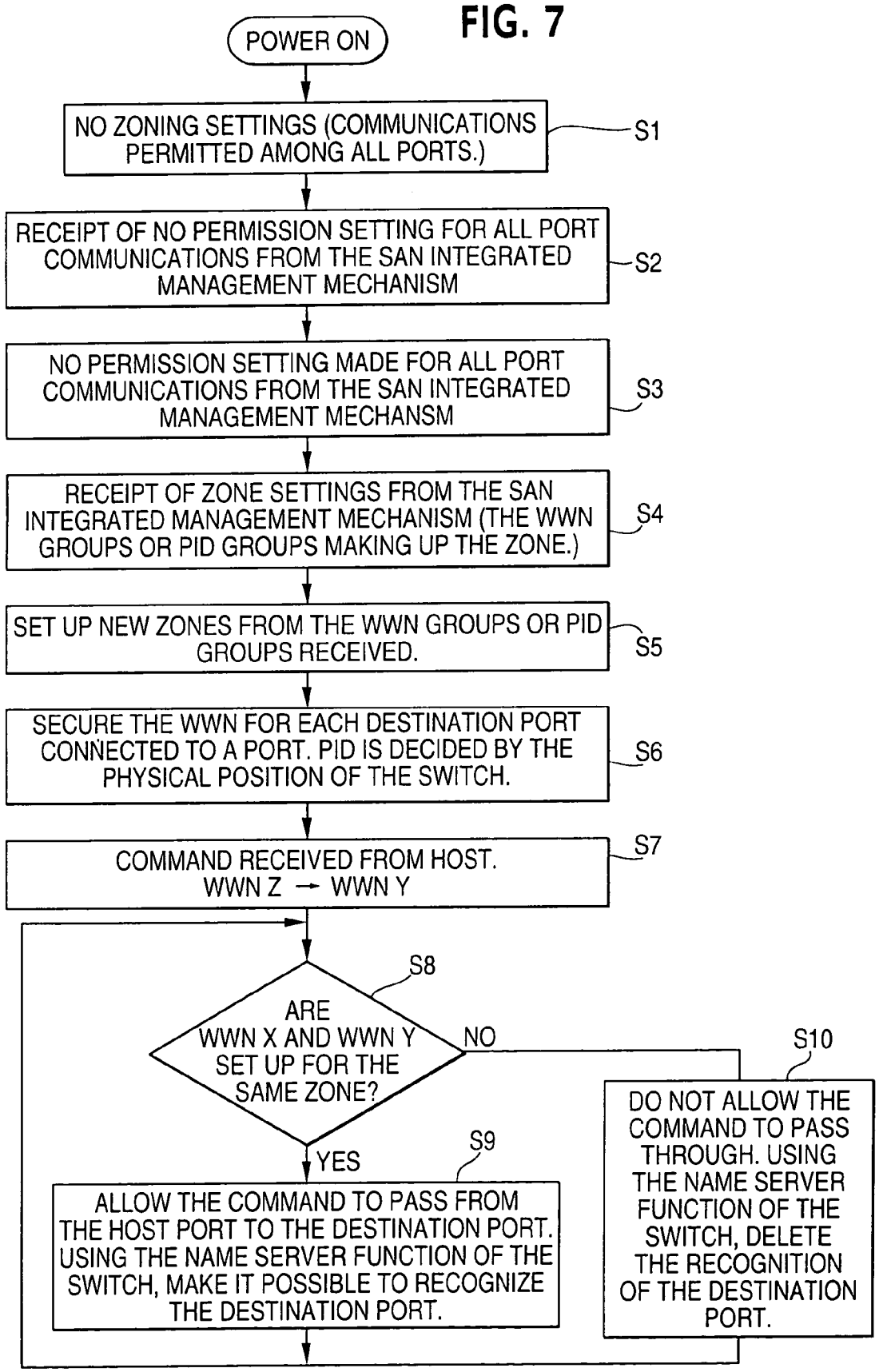

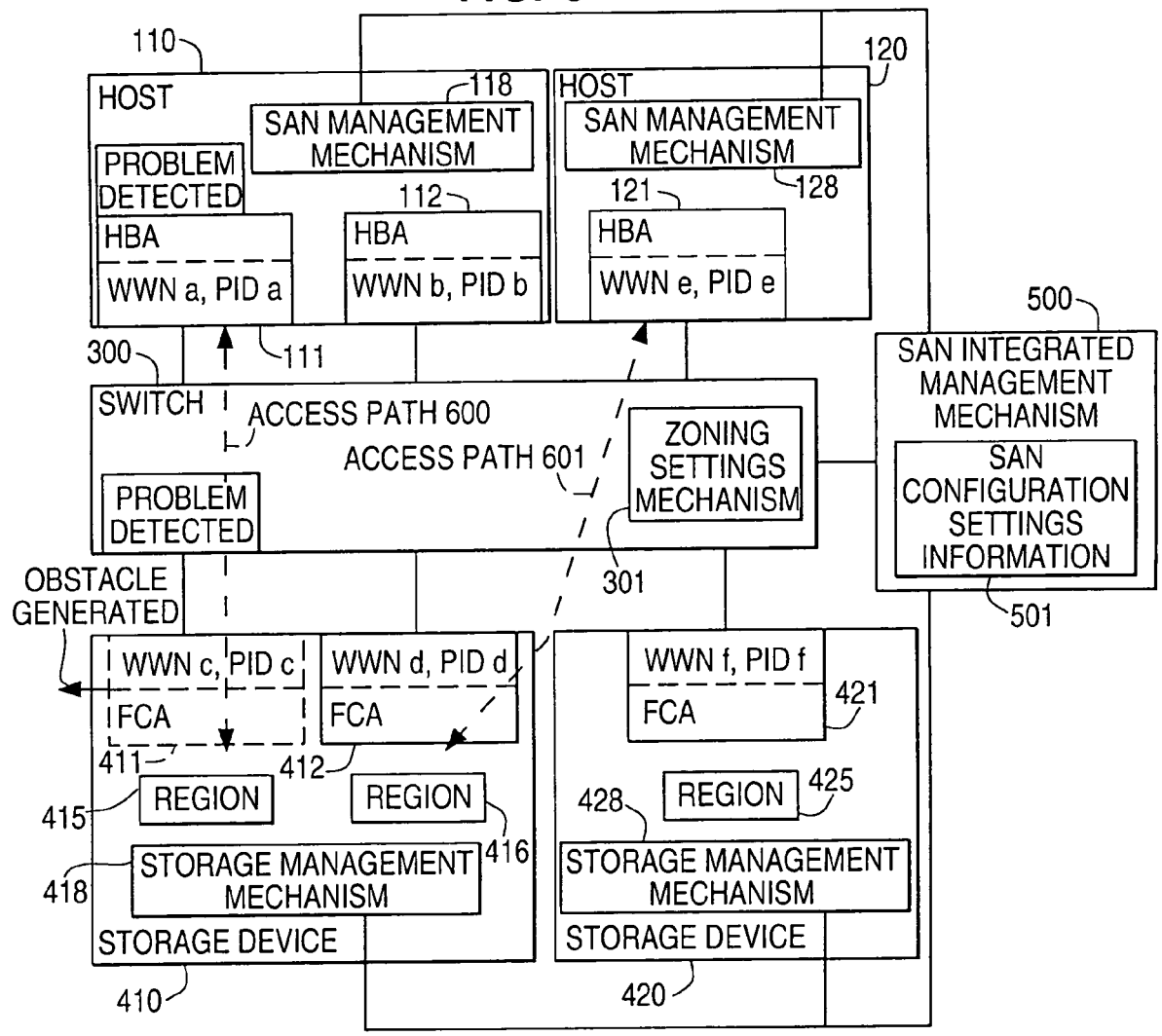

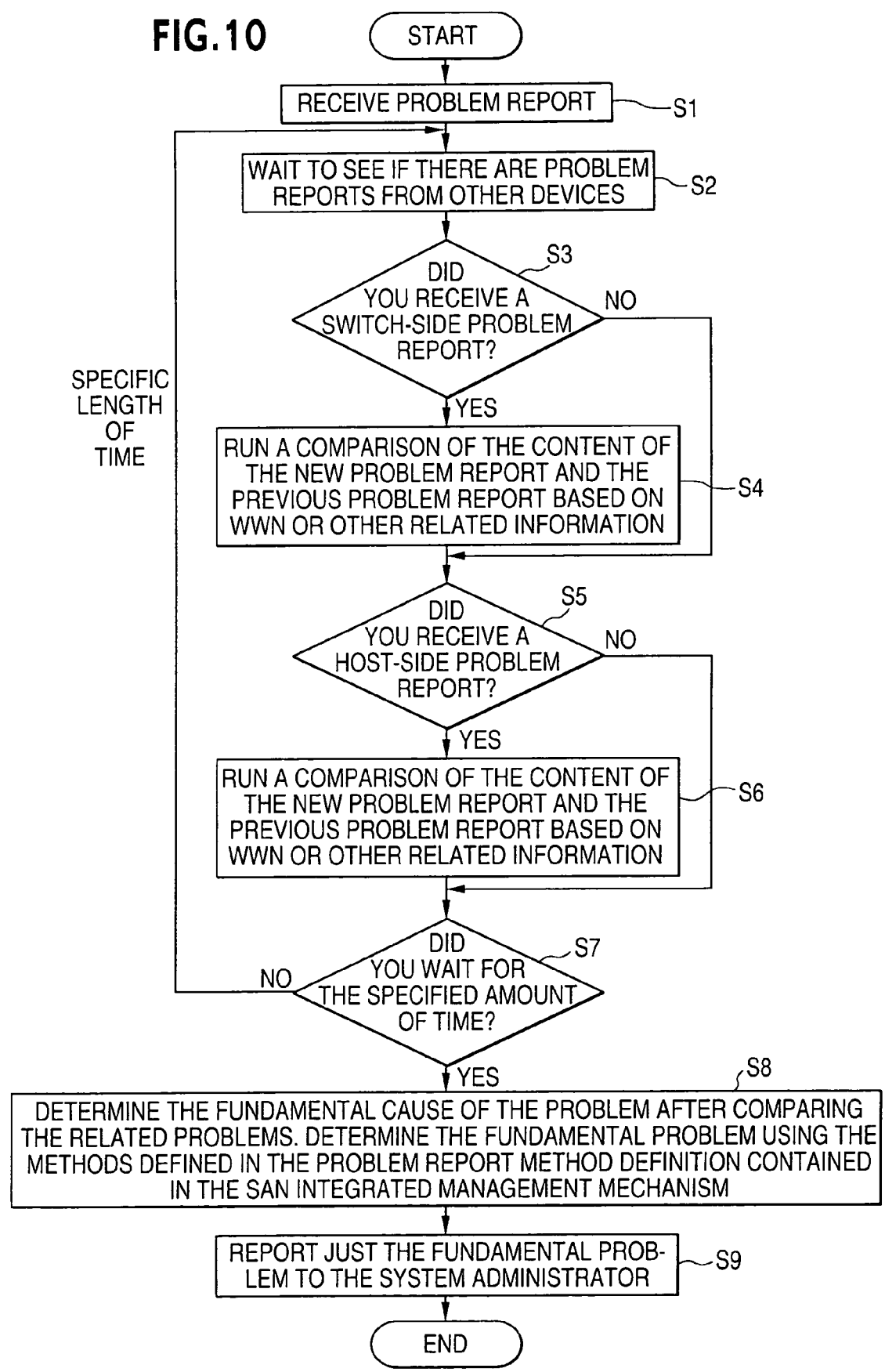

STORAGE AREA NETWORK MANAGEMENT SYSTEM, METHOD, AND COMPUTER-READABLE MEDIUM

CROSS REFERENCE TO RELATED APPLICATIONS

The contents of Japanese Patent Application No. 2000-167482, filed Jun. 5, 2000 in Japan, are incorporated herein by reference.

BACKGROUND OF THE INVENTION

1. Field of the invention

The present invention pertains to the management systems of storage area networks (hereafter referred to as SAN) that join several servers and several storage devices using fiber channel networks.

2. Description of the Related Art

In recent years, the capacity of single storage systems has increased and they now need to be able to function with several different types of servers. Also, with the advent of the widespread use of fiber channels, which can transfer data in parallel along data transfer routes at high speeds and among several host computers, it is expected that the scale of the connection format of storage systems is going to become even larger in this environment.

Joining several servers and several storage devices together in this way is referred to as a storage area network (hereafter referred to as a SAN) and attempts are being made to reduce the total cost of ownership (TCO) or manage the storage needs of several servers that are increasingly dispersed.

Be that as it may, however, there are some problems that require solving in the areas of security and the management of regions on a storage device.

One of these problems is that it is possible for data in one storage device that is being used by one host to be inadvertently destroyed by another host when a SAN is made up of several host computers (hereafter referred to as hosts) and several storage systems. This is because all of the hosts are capable of accessing all of the storage systems.

At present there are no perfect solutions to the problems of managing regions in storage systems or security. Moreover, when there is a problem with one of the many devices making up a SAN, many different error reports are sent to the system administrator, making it difficult to pinpoint an affected area and resulting in no real method for doing so.

Several terms used herein are well known in the art. More particularly, SAN (storage area network), FCA (fiber channel adapter), HBA (host bus adapter), WWN (world wide name), PID (port identification), and TCO (total cost of ownership) are terms which are well known in the art.

SUMMARY OF THE INVENTION

The present invention solves the above-mentioned problems.

An object of the present invention is to integrate and manage the traditionally dispersed security system from a single source.

Another object of the present invention is to provide good security administration automatically in a storage area network (SAN).

The present invention comprises a storage area network management system, method, and computer-readable medium storing a program executing processes.

The storage area network management system, method, and computer readable medium of the present invention comprise host computers, storage devices, switches, and an integrated management mechanism. Each of the host computers comprises a storage area network management mechanism. Each of the storage devices comprises a storage management mechanism. The switches are coupled to the host computers and to the storage devices. The switches interconnect the host computers and the storage devices. Each of the switches comprises a region-setting mechanism. The integrated management mechanism integrates and controls the storage area network. The integrated management mechanism includes access route information of the host computers and the storage devices and, based on the access route information, transmits access management information to the storage devices and the storage area network management mechanisms of the host computers, transmits region information to the region-setting mechanisms of the switches, and transmits access limit information concerning the host computers to the storage management mechanisms of the storage devices.

Moreover, the storage area network management system, method, and computer-readable medium of the present invention comprises the integrated management mechanism detecting whether fiber channel adapters mounted on the storage devices and the host computers, the host bus adapters mounted on the host computers, or the switches in the storage area network management system are replaced, obtaining settings information following the replacement from the storage area network management mechanism of the host computers, the switch region-setting mechanism, or the storage device storage management mechanism, and reconfiguring the access relationships to be equivalent to the access relationships prior to the replacement.

In addition, the storage area network management system, method, and computer-readable medium of the present invention integrates problem reports from related problems into a single problem report.

Further, the present invention comprises a method of a storage area network system comprising integrating and controlling the storage area network by an integrated management mechanism managing access relationships between host computers of the storage area network and storage devices of the storage area network.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a diagram showing a typical storage device hardware configuration.

FIGS. 5(a), 5(b), 5(c), and 5(d) are diagrams showing examples of access pass settings information, a storage affinity table, a switch, a zoning table and a host affinity table.

FIG. 6 is a flowchart showing the process performed by the SAN integrated management mechanism of the present invention.

FIG. 7 is a flowchart showing the process performed by the zoning settings mechanism.

FIG. 8 is a diagram describing a SAN problem management.

FIG. 9 is a diagram showing a typical problem report method definition.

FIG. 10 is a flowchart of the SAN problem monitoring function performed by the SAN integrated management mechanism.

DESCRIPTION OF THE PREFERRED EMBODIMENTS

Figure 1:
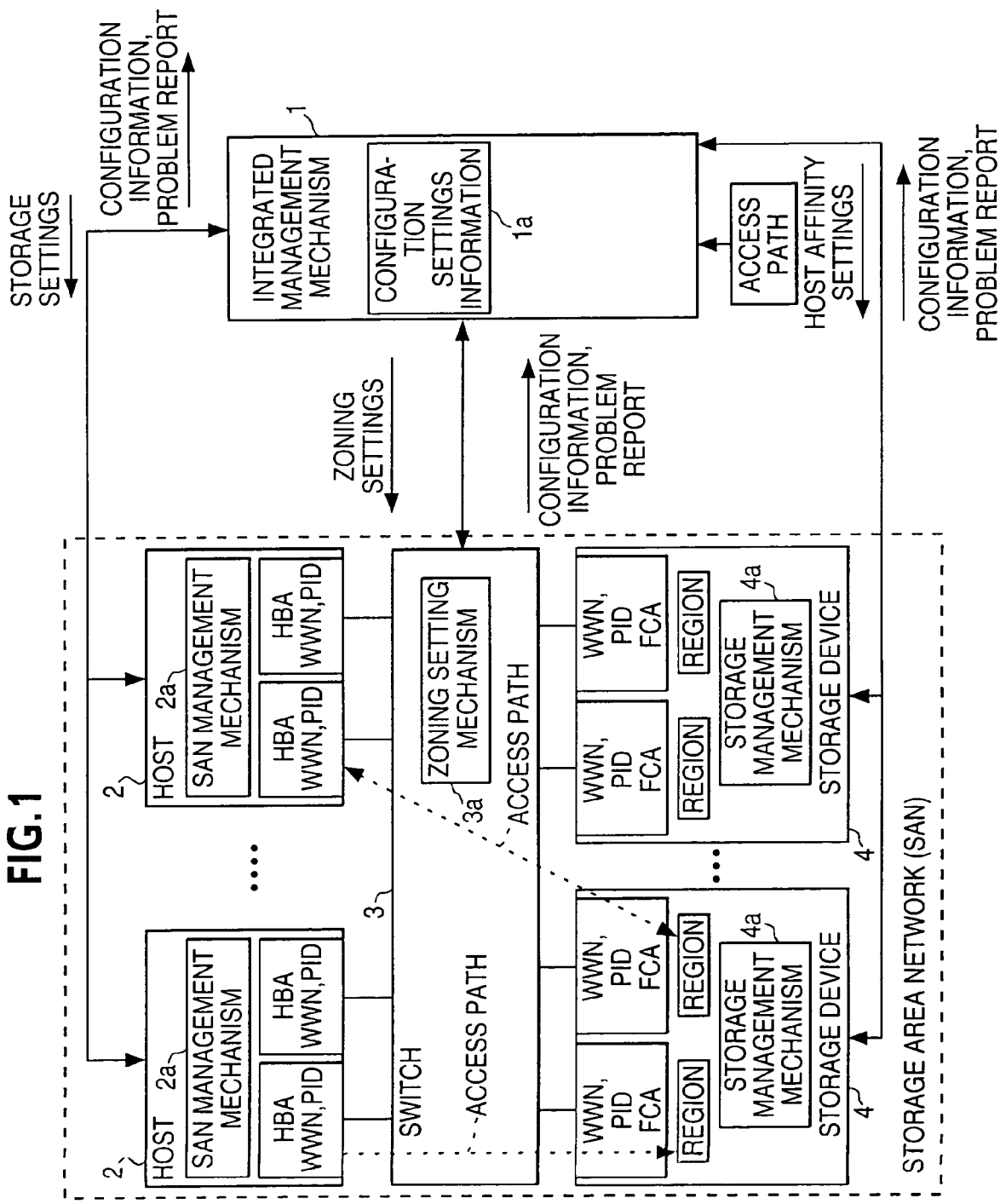
FIG. 1 is a schematic diagram of the present invention.

FIG. 1 is a schematic diagram of a Storage Area Network Management system 100 of the present invention. As shown in FIG. 1, the Storage Area Network Management system 100 of the present invention installs in a SAN environment, an integrated management mechanism 1 of the present invention that integrates and controls the SAN so that all of the access relationships of the hosts 2 and the storage devices 4 are managed using the integrated management mechanism 1. The system administrator sets up the regions on the storage device 4 side that are to access the integrated management mechanism 1 from the host 2 side as well as the fiber channel adapter (FCA) and host bus adapter (HBA) to be used when accessing that storage. These settings are referred to as the access paths.

Based on the access path information that was set up, this integrated management mechanism 1 first establishes the storage settings (or Storage affinity) that is seen from the host 2 side by the SAN management mechanism 2*a* on the host 2 side.

Then, the integrated management mechanism 1 establishes the zoning for the switch 3 zoning setting mechanism 3*a* by securing the World Wide Name (WWN) and Port Identification (PID) information that the FCA and HBA have and then makes calculations that allow the access paths that were set up based on that information to be configured. Next, the settings are made in the storage management mechanism 4*a* of the storage device 4, to determine which FCA is to permit access to which HBA (WWN or PID) and to which regions.

As above, installing the integrated management mechanism 1 makes it possible to conduct comprehensive security management and storage region to management in a storage area network system.

Also, by setting up the above integrated management mechanism 1 so that the integrated management mechanism 1 holds the SAN configuration status as the configuration setting information 1*a*, it is easy for the SAN to accommodate hosts that do not have SAN management functions or switches that do not have zoning devices, allowing for as much security as possible.

Furthermore, by installing the aforementioned integrated management mechanism 1 the following functions become possible:

(1) Integrated management mechanism 1 secures the SAN configuration status from individual devices and stores that as configuration settings information 1*a*. Then, either at regular intervals or when given a command by a system administrator, the integrated management mechanism 1 reads in the current SAN configuration status and compares that with the SAN configuration settings information 1*a*. If they differ, the integrated management mechanism 1 determines that there is a problem and notifies the system administrator. This makes it easy for system administrators to be able to learn about SAN problems.

(2) When given the command from the system administrator, the integrated management mechanism 1 secures access relationships information from the SAN management mechanism 2*a*, the zoning settings mechanism 3*a* and the storage management mechanism 4*a*, and checks the compatibility of the access paths. If the access paths are not set up correctly, the integrated management mechanism 1 notifies the system administrator as to where the problem is. This makes it possible for the system administrator to verify the compatibility of the access paths.

(3) When the host 2, the host 2 HBA, the switch 3 or the FCA of the storage device 3 are replaced, the aforementioned integrated management mechanism 1 detects this, obtains the settings information after the replacement from the host 2 SAN management mechanism 2*a*, the switch 3 zoning settings mechanism 3*a*, or the storage management mechanism 4*a* of the storage device 4, and reconfigures the access relationships so that they will be equivalent to those prior to the replacement. This makes it possible to respond easily to modifications in the SAN configuration easily.

(4) When the access paths are not set up when the system is first brought up, the settings to switch 3 are configured such that no access is allowed. This makes it possible to avoid settings which allow accidental access when the system is first started up and no access paths have been set up.

(5) In the fiber channels, there are fiber channel transfer class parameters for which the HBA and FCA sides are to be set up with shared settings. If these parameters are different on the HBA side and FCA side, transfers will be impossible.

For this reason, when setting up the aforementioned access paths, the transfer class to use is specified by the system administrator and, through the SAN management mechanism 2*a*, the storage management mechanism 4*a*, the integrated management mechanism 1 is set up so that the access paths set by the HBA and the FCA operate using the same transfer classes. This allows the elimination of the problem of being unable to transfer data when the transfer classes differ.

(6) When a problem occurs inside the SAN, first, the integrated management mechanism 1 receives a report of that problem and temporarily stops sending reports to the system administrator. It then waits for a specific period of time to see if there have been any reports from any of the other devices managed by the integrated management mechanism 1. It checks the content of any reports received during this waiting period against the WWN, PID and access path information of each adapter that the integrated management mechanism 1 holds and checks for a possible relationship to the problem reported first. If it is determined that there is a relationship, only one problem is reported to the system administrator. Based on this information, the system administrator can determine immediately the problem area.

(7) It doesn't just report on one affected area. Even reports where the affected area has been judged to be unrelated in a report may be reported as a related problem. This makes it possible for the system administrator to determine the scope of the effect.

(8) The integrated management mechanism 1 secures not only settings information for each of the access paths in advance, it also secures logical volume information on the host 2 side that is used on each access path as well as information from the SAN management mechanism 2*a* on the host 2 side and stores it as the configuration settings information la of the integrated management mechanism 1. When a problem is reported in the SAN, the integrated management mechanism 1 reads in the configuration settings information 1a in the integrated management mechanism 1 for the access path using the affected spot and reads the host logical volume using that access path and reports the logical volumes affected by the trouble to the system administrator. Once the logical volume affected by the problem is known, the recovery of that logical volume can be started immediately and the effect on business operations can be kept to a minimum.

Embodiments of the Present Invention

Figure 2:
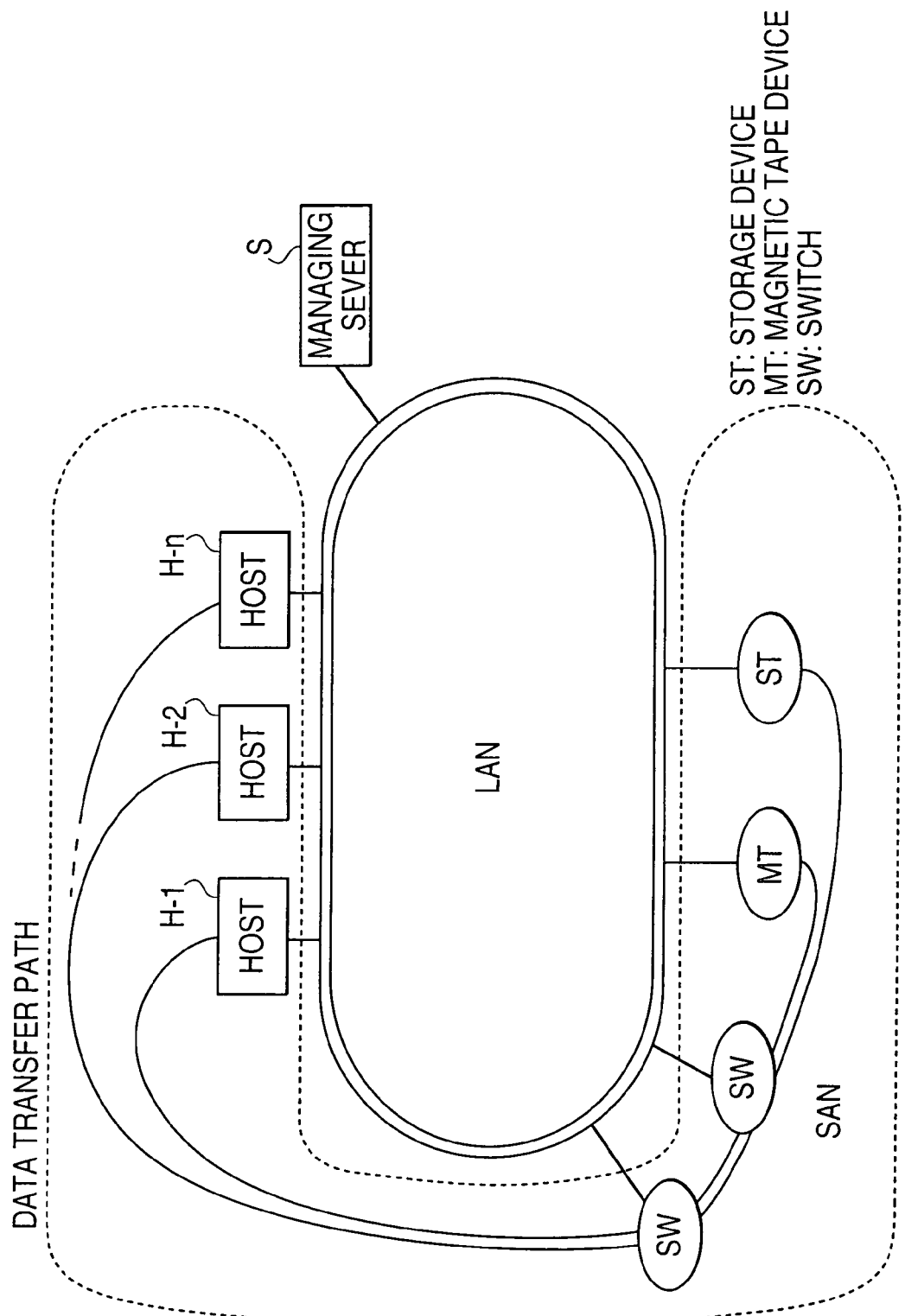
FIG. 2 is a diagram showing a typical SAN system configuration suitable for the present invention.

FIG. 2 shows an example of a SAN system configuration 200 that could be used with the present invention discussed with reference to FIG. 1. As shown in FIG. 2, the LAN (local area network) 210 in which many host computers (hereafter referred to as hosts) H1~Hn, management servers S which function as SAN comprehensive management devices (discussed below), the aforementioned switches SW1~SWm, the storage devices ST, and the magnetic tape devices MT are connected.

The SAN 220 (storage area network) is equipped with the hosts Hi~Hn, the switches SW, the storage devices ST, the magnetic tape devices MT and other devices. There are data paths among the various hosts H1~Hn, the switches SW1~SWm, the storage devices ST and the magnetic tape devices MT. Access between the hosts H1~Hn to the storage devices ST and other devices has priority over the data paths. The information showing the configuration status of the SAN 220 is also transferred by the storage device ST over the LAN to the management server S and all of the settings information that comes from the management server S is transferred to the host computers H1~Hn, the switches SW and the storage devices ST.

Figure 3:
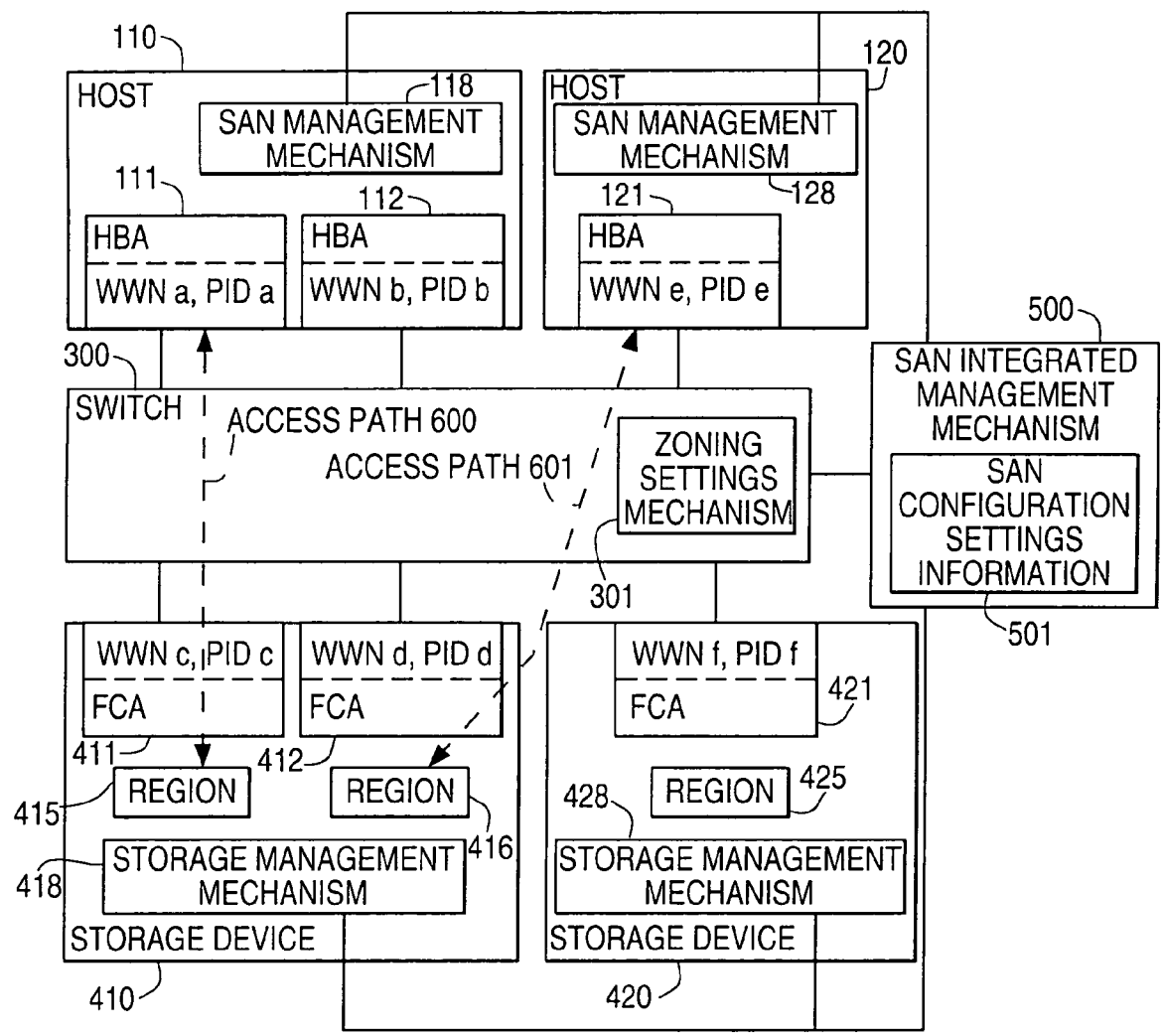
FIG. 3 is a diagram showing the configuration of the SAN management system of one embodiment of the present invention.

FIG. 3 is a diagram showing the configuration of the storage area network (SAN) 200 of the embodiment of the present invention. Here, as an example, the SAN 200 includes the hosts 110 and 120, the switch 300 and the storage devices 410 and 420. In FIG. 3, the hosts 110 and 120 are connected to the switches 300 by the fiber channel 303, 304 through the host bus adapters (hereafter referred to as HBA) 111, 112 and 121. The storage devices 410 and 420 are also connected to the switches 300 by the fiber channel adapters (hereafter referred to as FCA) 411, 412 and 421.

FIG. 4 shows an example of a hardware configuration of a storage device 430 corresponding to one of the storage devices 410, 420 shown in FIG. 3. In the storage device 430 shown in subsystem control module 11 is connected to upper devices 130, 132 (such as host devices 110, 120) through channel I/F modules 134, 136. The subsystem control module 11 includes a memory 11a, an MPU 11b and a bus interface module 11c. The aforementioned MPU 11b runs programs stored in the memory 11a. In addition to programs, transfer data and control data are also stored in the memory 11a.

Device control module 13 includes buffer 13a, MPU 13b and memory 13c. Memory 13c stores programs that run on the aforementioned MPU 13b and bus interface module 13d.

The aforementioned subsystem control module 11 and the device control module 13 are connected to each other through the bus 138. The device control module 13 is connected to the disk drive group 15 through the device I/F module 14.

In the SAN environment described above, the management mechanism 500 (corresponding to the management server S in FIG. 2, mentioned above, which includes this function) which integrates and controls the SAN, was installed in this embodiment as shown in FIG. 3. The embodiment of SAN 220 is set up so that the management mechanism 500 can manage the access relationships between the hosts 110 and 120 and the storage devices 410 and 420, as shown in FIG. 3.

The SAN management mechanisms 118 and 128 are also installed on the hosts 110 and 120 and the storage management mechanisms 418 and 428 are installed on the storage devices 410 and 420 in order to respond to control from the management mechanism 500.

As described above, the SAN management mechanisms are mechanisms that set up the storage affinity; also as described above, the storage management mechanisms are mechanisms that set up the host affinity. The switch zoning settings mechanism 301 is installed on the switch 300

The system administrator sets up the region on the storage side that attempts to access the SAN integrated management mechanism 500 from the host side and the FCA (fiber channel adapter) and the HBA (host bus adapter) that are used when accessing that storage. These settings are referred to as the access path settings.

In this SAN integrated management mechanism 500, the access path information that has been set up is stored as access path settings information 600 in the SAN integrated management mechanism 500 shown in FIG. 5(a). Using this settings information, the storage settings (Storage affinity) that can be seen from the host side are set up on the SAN management mechanisms 118 and 128 on the host side. That is, they are set up to determine which FCA (WWN or PID) can be accessed from which HAB.

The settings specifying which FCA can be accessed from which HBA are organized by creating a management table in the host like the storage affinity 602 shown in FIG. 5(b) and specifying the FCA to be accessed. In this example, the settings allow access to region 415 in the FCA of WWN c from HBA 111. The command on the fiber channel can be run through the WWN of the destination FCA.

The WWN and PID information held by the FCA and HBA is secured in advance in response to the zoning settings mechanisms 301 of the switches 300. Calculations are made so that the access paths originally set up are configured and the zoning is set up. FIG. 5(c) shows an example of a switch zoning table 604.

The zones here are set up using A and B and the identifier (here WWN) of the ports (HBA or FCA) that permits mutual access is stored in the respective zones. In this way, Zone A is recognized for access from the switch WWN a and an access restriction which only allows operations to be run on WWN c is put in place.

In the fiber channel environment, when the switches 300 and the ports are connected, a log-in sequence begins and the switch is able to secure WWN information as part of that log-in sequence. When commands are issued from the hosts 110 and 120 to the storage devices 410 and 420 using this information, if the access of a port that has not been specified for the zone is designated, the system control prevents the command from reaching the storage devices 410 and 420.

Next, the access settings are set up to determine which regions will be permitted access to the storage management mechanisms 418 and 428 of the storage devices 410 and 420 from which HBA or PID of the storage devices 410 and 420. FIG. 5(d) shows a sample host affinity table 606.

Based on this table 606, only access from the HBA of the WWN a will be allowed to region 415 for FCA 411 and only access from the HBA of the WWN e will be allowed to region 416 for FCA 412.

In a fiber channel environment, there is a log in sequence in which mutual port information is exchanged before accepting a command from a host.

The WWN, PID and other destination information are verified during that sequence.

Here, the FCA determines whether or not access is permitted of the destination information of the WWN or PID that has been secured. The processing will continue only for devices permitted access. Access attempts by those without permission will result in check condition or other error responses.

There are some devices that have no SAN management mechanism among the host devices making up the SAN. There are also devices which do not provide the aforementioned host affinity function even inside the storage device. For this reason, the management mechanism 500 would not designate the access relationships for this sort of device, but the security would be assured by other security systems (such as Storage affinity or zoning).

FIG. 6 is a flowchart 650 showing a specific example of the operation of the SAN integrated management mechanism 500. The processes shown in FIG. 6 are stored on a computer-readable medium storing an integrated management program which, when executed by a computer, causes the computer to execute the processes shown in FIG. 6.

First, the SAN integrated management mechanism 500 reads in the FCA, the WWN of the HBA and the PID (Process 652). In the example in FIG. 3, the SAN integrated management mechanism 500 would recognize that the HBA 111 of the host 110 was WWN a and PID a, that the FCA 411 of the storage device 410 was WWN c, PID c and the FCA 412 was WWN d and PID d.

Next, the SAN integrated management mechanism 500 would accept the FCA scheduled for access from the HBA and its subordinate regions (Process 654). In the example in FIG. 3, it would accept the path settings for access to the region 415 through the FCA 411 of the storage device 410 from the HBA 111 of the host 110.

Next, the host in question would check to see if the storage affinity function were supported or not (Process 656). If the storage affinity function is not supported, control would pass to Process 660. If the storage affinity function is supported then in Process 650, the storage affinity function would allow the SAN integrated management mechanism 500 to use the PID or the WWN to set up the devices (Process 658) that can access the host side SAN management mechanism from the HBA.

For example, in the example in FIG. 3, the SAN management mechanism 118 is set up so that it can access the WWN c or the PID c that are the identifiers of the FCA 411 of the storage device 410 from the HBA 111 of the host 110. 10. Next, it will check to see if the switch supports the zoning function (Process 660). If the zoning function is not supported, it will go on to Process 664. If the zoning function is supported, the zoning settings mechanism of the switch establishes the zoning function to use WWN or PID in Process 662.

In the example in FIG. 3, for instance, the access to the FCA 411 of the storage device 410 from the HBA 111 of the host 110 would be either the WWN a~WWN c zoning settings or the PID a~PID c zoning settings. One of those would be set to the zoning settings function 301 of the switch 300.

Next, there is a check to determines whether the storage device supports the host affinity function (Process 664). If the host affinity function is not supported, the process ends. If the host affinity function is supported, then, in Process 666, the host affinity function is used to set up the relationships between the region and the PID or the WWN of the host-side HBA that is permitted access from the FCA.

For example, the example in FIG. 3 is set up so that commands from the PID a or the WWN a of the host 110 HBA 111 are accepted by the FCA 411 of the storage device 410. Also, the storage management mechanism 418 of the storage device 410 is set up so that it can access the region 415 in response to commands from either the WWN a or the PID a.

Next, the flowchart 700 in FIG. 7 describes operations performed by the zoning settings mechanism 301 in the switches 300.

First, the zoning settings mechanism 301 is set to a state without zoning settings (a mode which permits communications among all ports) (Process 702). That is, the standard is that no zones are set and that all access is permitted.

Next, the zoning settings mechanism 301 accepts a non-permission setting for communications among all ports from the SAN integrated management mechanism 500 (Process 704), which sets it up so that communications among no ports is permitted (Process 706). By setting it up in this way so that no communication is permitted among ports, the problem of accidental access when the system is started up and no access paths have been specified can be avoided.

Next, the zone settings (the PID groups or the WWN groups, making up the zone) are accepted from the SAN integrated management mechanism 500 (Process 708). These zone settings are made, for example, by the system administrator through the SAN integrated management mechanism 500.

New zone settings are made for the zoning settings mechanism 301 using the WWN groups or PID groups accepted above (Process 710). Next, the switches 300 secure the WWN of the destination ports connected to each of the ports (Process 712). Note that the PID is determined by the position of the physical port of the switches 300.

Here, when the command is issued from the host port WWN x to the destination port WWN y, the switch 300 accepts the aforementioned command (WWN x→WWN y) (Process 714). Then, the zoning settings mechanism 301 checks to see if WWN x and WWN y are set for the same zone (Process 716).

If they are set for the same zone, the command passes from the host port to the destination port. That is, the destination port is made recognizable using the name server function of the switch 300 (Process 718). And, if the settings are not for the same zone, the command is not allowed to pass. That is, the destination port recognition is deleted using the name server function of the switch 300 (Process 720).

Next, the fundamentals of the host input/output process (I/O operations) in the SAN environment described above are described.

The following is a description (using FIG. 3 mentioned above) of a typical process in which an I/O operation issued from the host 110 and 120. Note that this description concerns the I/O to the storage devices 410 from the host 110 through the HBA 111, the switch 300 and the FCA 411.

First, from the storage affinity table shown in FIG. 5 (b) mentioned above, the host 110 recognizes that the region 415 access requires accessing the FCA with a WWN c through the HBA 111.

Based on this information, the host 110 issues a fiber channel frame to the HBA 111 switch 300 as the I/O for WWN c.

The I/O fiber channel frame is secured for the WWN c accepted from the HBA 111 of the switch 300 and access is permitted because the WWN c and WWN a of the HBA 111 are in the same zone on the switch zoning table shown in FIG. 5 (c) mentioned above. The fiber channel frame is transferred to the FCA 411 that is specified by the WWN c value.

The fiber channel frame received from the FCA 411 is recognized as having come from WWN a which is designated in the host affinity table in FIG. 5 (d) mentioned above, so it determines that it can process this and runs the I/O.

The following is a description of the functions of the SAN integrated management mechanism 500 above.

(1) Detection of System Problems by Comparing the SAN Configuration Settings Information As stated above, the SAN integrated management mechanism 500 secures SAN configuration information from each of the devices and stores that in the SAN configuration settings information 501.

The SAN integrated management mechanism 500 also reads in the current SAN configuration information at regular intervals or when instructed by a system administrator, compares that with the SAN configuration settings information 501 and notifies the system administrator if it determines that there has been a problem. For example, in the state in FIG. 3 above, the SAN configuration settings information 501 was registered and then the storage device 420 power supply went out. The SAN determines that there was a problem with the configuration and reported to the system administrator that the storage device 420 could no longer be seen.

(2) Access Path Match Verification

When given a command by the system administrator, the SAN integrated management mechanism 500 secures the access relationships information from the SAN management mechanisms 118 and 128, the zoning settings mechanism 301, the storage management mechanism 418 and 428 and verifies that the access path(s) match.

If the access paths are not set up correctly, the system administrator will be notified of a problem in that section. This function makes checking for problems possible if a system administrator has gone and changed the settings on individual equipment.

Also, if the SAN is already in a state where the access paths have already been set up, when the SAN management logic is incorporated anew, the existing SAN access paths can be checked to see if they are set up correctly.

(3) Reconfiguring the Access Relationship Settings for HBA Replacement

When the HBA 111 on the host 110 side fails and is replaced with a new HBA, the SAN management mechanism 118 detects the HBA replacement and notifies the system administrator. Using the new configuration settings command from the system administrator, the SAN management mechanism 118 reports that a new HBA WWN was replaced in the SAN integrated management mechanism 500.

The SAN integrated management mechanism 500 uses the new WWN to re-establish access relationships that are equivalent to those prior to the HBA replacement. It then sets up the access relationships once more in two mechanisms that set up access relationships (Zoning settings mechanism 301 and the storage management mechanism 418).

(4) Reconfiguring the Access Relationship Settings for Host Replacement

When the host 110 fails and is replaced with a new host, the SAN management mechanism 118 on the host 110 detects that the settings are gone and notifies the system administrator. Using the new configuration settings command from the system administrator, the SAN management mechanism 118 reports that a new HBA WWN has been connected to the SAN integrated management mechanism 500 and the SAN integrated management mechanism 500 uses that WWN to establish access relationships that are equivalent to those prior to the HBA replacement. It then sets up the access relationships once more in two mechanisms that set up access relationships (Zoning settings mechanism 301 and the storage management mechanism 418).

(5) Reconfiguring the Access Relationship Settings for Switch Replacement When the switch 300 fails and is replaced, the system detects that the zoning information that was set in the switch is missing and notifies the system administrator.

A reconfigure settings command from the system administrator establishes a mechanism in the SAN integrated management mechanism 500 that will set the access relationships for the new switch to those prior to the failure. In this case, the access relationships in the new switch will be reset by the SAN integrated management mechanism 500 to those prior to the failure.

Note that when the switch 300 fails and is replaced, the absence of zoning information that was set up for the switch will be detected, but the system can be configured so that instead of sending a notice out to the system administrator, a mechanism can be built into the SAN integrated management mechanism 500 that automatically sets up the access relationships in the new switch to those prior to the failure from the SAN integrated management mechanism 500.

(6) Reconfiguring the Access Relationship Settings for FCA Replacement

When the storage device-side 410 FCA 411 fails and the FCA-side WWN are replaced, the system detects this and reports it to the system administrator.

Based on a command from the system administrator to reconfigure the settings, the storage management mechanism 418 detects a new FCA WWN and reports this to the SAN integrated management mechanism 500. The SAN integrated management mechanism 500 uses that new WWN to re-establish access relationships that are equivalent to those prior to the FCA replacement. It then sets up the access relationships once again in two mechanisms that set up access relationships (the SAN management mechanism 118 and zoning settings mechanism 301).

(7) Prevention of Accidental Access Settings

As stated above, in order to avoid settings that allow accidental access before the access paths have been set up when the system is started up, the switches are set up so that they are not permitted any access when the system is brought up without the access path settings.

Without such settings, all of the hosts would be able to access all of the SAN storage and that could cause problems of security.

(8) Setting up the Fiber Channel Transfer Classes

Fiber Channels (FC) have parameters referred to as FC transfer classes for which the settings should be shared on the HBA and FCA sides. The transfer classes in this system range from 1~3, and transfer class 1 is used sparingly. Transfer class 2 returns an acknowledge following the transfer and transfer class 3 does not return an acknowledge following the transfer. If these parameters on the HBA and FCA sides are different, transfers cannot take place.

That is why when setting up the access paths discussed above, the classes to be used are specified by the system administrator and the management mechanism 500 is set up to run on the same classes specified for the access paths specified for the HBA and FCA throughout the management mechanisms 118 and 128 and the storage management mechanisms 418 and 428.

The following is a description of the aforementioned SAN trouble monitor using the SAN integrated management mechanism 500.

The method used is basically that when using the SAN integrated management mechanism 500, when there are problems with the devices making up the SAN (hosts, switches and storage devices), the SAN integrated management mechanism 500 receives all reports of device problems from the device side and reports them to the system administrator.

However, as shown in FIG. 8, when there is a problem with FCA 411, not only does the storage device 410 send a report to SAN integrated management mechanism 500 that the FCA 411 has failed, the switch 300 sends out a report that either the FCA 411 or the switch port connected to the FCA 411 has malfunctioned and a report that the access paths from the host 110 side and from the HBA 111 cannot be used.

It follows that a method is needed for compiling the problem reports from these three places into one report for the system administrator. This method is described below.

When there is a problem in the SAN, first the SAN integrated management mechanism 500 receives a report of that problem and then stops reports to the system administrator for a time. That is, the SAN integrated management mechanism 500 waits for a specific period of time (for example, one minute) to see if any other problems are reported from other devices that the SAN integrated management mechanism 500 manages.

While the SAN integrated management mechanism 500 is waiting, the SAN integrated management mechanism 500 reviews the content of the problem report that the SAN integrated management mechanism 500 received and the SAN integrated management mechanism 500 starts checking the WWN, PID or the aforementioned access path information held in the SAN integrated management mechanism 500 for each of the adapters to see if there might be something related to the first problem received.

If a related problem is found after the check, it follows the problem report method definition 800 shown in FIG. 9 that is set up in advance in the SAN integrated management mechanism 500 and reports just one problem to the system administrator. Using this information, the system administrator can determine where the affected point is immediately FIG. 9 shows an example of the problem report method definition 800. FIG. 9, the column on the left shows the problem information that the SAN integrated management mechanism 500 received and the column on the right shows the content of the problem report made up by the SAN integrated management mechanism 500.

For instance, if the SAN integrated management mechanism 500 receives the following problem reports: FCA error, switch port access error and host-side access error, the SAN integrated management mechanism 500 will judge it to be an FCA error and send out a problem report.

The following is a description of the SAN problem-monitoring function of the SAN integrated management mechanism 500 and an example of the FCA 411 problem report method based on the flowchart 1000 in FIG. 10.

First the SAN integrated management mechanism 500 receives a problem report (Process 1002). If, for example, the problem took place in the FCA 411, the SAN integrated management mechanism 500 would receive an FCA 411 problem report from the storage device 410.

Based on this, the SAN integrated management mechanism 500 would wait for a specific period of time to see if there were problem reports from other devices (Process 1004).

If the SAN integrated management mechanism 500 receives a problem report from the switch side (Process 1006), the SAN integrated management mechanism 500 would compare the content of the new problem report against the earlier problem report based on related information from the WWNs and other devices (Process 1008). For example, if the SAN integrated management mechanism 500 received a report that there were path errors with the WWN c and PID c from the switch 300, the SAN integrated management mechanism 500 would recognize that they were the same error because the WWN c and PID c are part of the FCA 411.

Next, when a problem report is received from the host side (Process 1010), the content of the new problem report is compared against the content of the earlier problem report based on related information from the WWN and other devices (Process 1012). If, for example, a report about a WWN a and PID a path error is received from the host 110, the SAN integrated management mechanism 500 is aware that the WWN a and PID a as well as the WWN c and the PID c are linked to the access path 600, so they will be recognized as the same problem.

After the aforementioned wait for a specific amount of time (Process 1014), the related information is compared and the fundamental cause of the problem is determined (Process 1016). This determination of the fundamental cause is performed using the aforementioned problem report definition contained in the SAN integrated management mechanism 500. For example, based on the aforementioned problem report definition, a problem on the host side and a problem on the Switch 300 side would be judged to be an FCA problem on the storage side.

Only the fundamental cause is reported to the system administrator once it has been determined (Process 1018). For example, for the aforementioned problem with the FCA 411, only the FCA 411 problem would be reported to the system administrator.

In the foregoing description, only the affected area was reported, but the system could be set up so that reports on problems that were not judged to have been related may also be reported with the related problems. In this way, the scope of the effect of the problem can be determined by the system administrator.

If the SAN integrated management mechanism 500 also secures the host side logical volume information used in the access paths from the SAN management mechanism 118 in addition to the settings information for each access path and stores that in the SAN configuration Settings information 501, the SAN integrated management mechanism 500 reports which logical volumes have been affected by the problem and report that to the system administrator.

That is, if problems are reported from inside the SAN 220, the access paths using the affected point are read in by the SAN integrated management mechanism 500 from the SAN configuration settings information 501 in the SAN integrated management mechanism 500. Furthermore, the host logical volumes using the access paths are also read in and the affected host logical volumes are reported to the system administrator as well. For example, for a problem with the FCA 411, region 415 would become unusable.

If the system administrator can figure out the logical volumes affected by the problem, the recovery of those logical volumes would be possible immediately, keeping the effect on business operations to a minimum.

A storage area network system of the present invention includes several computers and several storage devices forming a storage area network connected by switches. The aforementioned storage area network is equipped with an integrated management device that integrates and manages said storage area network. In addition to being equipped with access path information of the host computers and storage devices, the integrated management device also sends out access management information to the storage area network management mechanism of the host computers and to the storage devices, region information to the region setting mechanisms of the switches, and access restriction information concerning the aforementioned host computer to the storage management mechanisms of the storage devices. When the fiber channel adapters which are mounted on the storage devices, the host computer, the host bus adapters which are mounted on the host computers or the switches in said storage area network management system are replaced, the aforementioned integrated management mechanism detects this, obtains the settings information following the replacement from the storage area network management mechanism of the host computers, the switch region-setting mechanism or the storage device storage management mechanism and reconfigures the access relationships so that they are equivalent to those prior to the replacement.

In addition, in the storage area network system of the present invention, when the host bus adapter of the host computer fails and is replaced, the integrated management mechanism detects the replacement of the host bus adapter and notifies the system administrator. The system administrator issues a reconfigure command and the integrated management mechanism passes along the settings information from the new, replacement host bus adapter in the storage area network management mechanism of the host computer. Using the new settings information, it configures the access relationships to be equivalent to those prior to the replacement of the host bus adapter and reconfigures the access relationships of the storage area network management mechanism, the region-setting mechanism and the storage management mechanism.

Moreover, in the storage area network system of the present invention, when the host computer fails and is replaced, the integrated management mechanism detects that the storage area network management mechanism of the host computer has no settings and notifies the system administrator. The system administrator issues a reconfigure command, which passes along to the integrated management mechanism the settings information of the connected host bus adapter. The integrated management mechanism uses that information to reconfigure the access relationships to be equivalent to those prior to the host computer replacement and then sets up the access relationships of the region-setting mechanism and the storage management mechanism once again.

Also in the storage area network system of the present invention, when a switch fails and is replaced, the integrated management mechanism detects that the region settings information that was set up in the switch is not present and notifies the system administrator. The system administrator issues a reconfigure command, which sets the access relationships prior to the replacement in the new switch and can reconfigure the access relationships.

Further in the storage area network system of the present invention, when a switch fails and is replaced, the integrated management mechanism detects that the region settings information that was set up in the switch is not present and the integrated management mechanism automatically sets up the access relationships prior to the failure in the new switch and then reconfigures the access relationships.

In addition in the storage area network system of the present invention, when the storage device side fiber channel adapter is replaced and the fiber channel adapter settings information is changed, the integrated management mechanism detects this and notifies the system administrator. The system administrator issues a reconfigure command and the storage management mechanism passes along the new settings information to the integrated management mechanism. The integrated management mechanism uses that new settings information to reconfigure the access relationships so that they are equivalent to those prior to the replacement and then configures once again the access relationships of the storage area network management mechanism and the region management mechanism.

Also, a storage area network system of the present invention includes several host computers and several storage devices connected by switches and is equipped with an integrated management mechanism that integrates and controls the above storage area network. The integrated management mechanism is equipped with the access path information of the host computers and storage devices and using said access path information, the integrated management mechanism sends out access management information to the storage devices and to the storage area network management mechanism, and the integrated management mechanism sends out region information to the switch region-setting mechanisms and sends out access restriction information concerning the aforementioned host computers to the storage management mechanisms of the storage devices. In this storage area network management system, when the system is started up and the access path information has not been set up, the aforementioned integrated management mechanism first sets up the region-setting mechanisms of the switches so that no access is permitted and after that, the integrated management mechanism sets up the regions on the regions settings mechanisms of the switches.

Further, a storage area network system of the present invention includes several host computers and several storage devices connected by switches and is equipped with an integrated management mechanism that integrates and control the above storage area network. The integrated management mechanism is equipped with the access path information of the host computers and storage devices and, using the access path information, the integrated management mechanism sends out access management information to the storage devices, region information to the switch region-setting mechanisms, and access restriction information concerning the above host computers to the storage management mechanisms of the storage devices. In this storage area network management system, the above integrated management mechanism sets up the specified fiber channel transfer classes using the storage area network management mechanism of the host computers whose access information has been set up, and the storage management mechanism of the storage devices. This makes the host bus adapters of the host computers and the fiber channel adapters of the storage devices operate using the same transfer class.

Moreover, a storage area network system of the present invention includes several host computers and several storage devices connected by means of switches and is equipped with an integrated management mechanism that integrates and control the above storage area network. The integrated management mechanism is equipped with the access path information of the host computers and storage devices and, using said access path information, the integrated management mechanism sends out access management information to the storage devices and the storage area network management mechanisms, region information to the switch region-setting mechanisms, and access restriction information concerning the above host computers to the storage management mechanisms of the storage devices. In this storage area network management system, when a problem occurs in the storage area network system the above integrated management mechanism receives problem information and, for a specified period of time, the integrated management mechanism waits to see if there are other problem reports. The integrated management mechanism checks the problem reports received during that period and investigates the relationship between them and the problem report received first. If the integrated management mechanism judges that they are related, the integrated management mechanism sends out a single report concerning just one affected area according to a problem report method definition set up in advance in the aforementioned integrated management mechanism.

In addition, the storage area network system of the present invention presents the related problem reports that it receives as related problems in addition to the single problem area.

Further, in the storage area network system of the present invention, in addition to the settings information for the access paths, the above integrated management mechanism also obtains and holds host-side logical volume information used in the access paths from the host computer storage area network management mechanism. When there is a report of a problem from within the storage area network, said access paths are used to read in the logical volume based on the access path information using said problem area, and report on the logical volumes that are affected by the problem.

Effects of the Present Invention

As described above, in the present invention, the SAN is equipped with an integrated management mechanism that integrates and controls storage area networks and the integrated management mechanism above keeps track of all of the access relationships between the hosts and storage devices making the following effects possible.
(1) It is possible to configure a highly reliable SAN system that is administered from one place. It is also compatible with past systems that lack host affinity, zoning or other functions, so it is not necessary to purchase an entirely new system in order to provide an operating environment for configuring a SAN.
(2) It is possible to check problems with SAN and the compatibility of access paths easily.
(3) The hosts, HAB , switches, storage devices, FCA and other components making up the SAN may be replaced or the SAN configuration may be changed and easily accommodated.
(4) If there is a problem with the SAN, the affect area and the scope of its effect can be determined easily, so the effect on business operations can be kept to a minimum.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

ELEMENT NUMBER LIST

1 Integrated Management Mechanism
1a Configuration Settings Information
2 Host
2a SAN Management Mechanism
3 Switch
3a Zoning Settings Mechanism
4 Storage Device
4a Storage Management Mechanism
14 Device I/F Module
100 Storage Area Network Management System
110, 120 Host
111, 112 Host Bus Adapter (HBA)
121 Host Bus Adapter (HBA)
130 Upper Device
132 Upper Device
134,136 Channel I/F Module
138 Bus
200 Storage Area Network System Configuration
210 Local Area Network
220 Storage Area Network
300 Switch
301 Zoning Settings Information
303, 304 Fiber Channels
410, 420 Storage Device
411, 421 Fiber Channel Adapter (FCA)
412 Fiber Channel Adapter (FCA)
418, 428 Storage Management Mechanism
500 SAN Integrated Management Mechanism
501 SAN Configuration Settings Information

What is claimed is:

1. A storage area network (SAN) management system comprising:
host computers, each comprising a storage area network management mechanism;
storage devices, each comprising a storage management mechanism;
switches coupled to the host computers and to the storage devices, said switches interconnecting the host computers and the storage devices, each of the switches comprising a region-setting mechanism; and
an integrated management mechanism to manage the SAN according to a process comprising:
obtaining access route information of the host computers and the storage devices;
setting up a storage affinity for each host, a switch zoning affinity for each switch, and a host affinity for each storage device, as a SAN configuration setting information based on said obtained access route information;
transmitting access management information to the storage devices and to the storage area network management mechanisms of the host computers, based upon the set storage affinity for a host computer;

transmitting region information to the region-setting mechanisms of the switches, based upon the set switch zoning affinity; and transmitting access limit information concerning the host computers to the storage management mechanisms of the storage devices, based upon the set host affinity for a storage device.

2. The storage area network management system as in claim 1, wherein the integrated management mechanism obtains a configuration status of the storage area network from each of the storage devices, the switches, and the host computers and stores said configuration status as the storage area network configuration settings information, and wherein at regular intervals, or when instructed by a system administrator, the integrated management mechanism gathers current configuration status of the storage area network, compares the current configuration status to the configuration settings information that was collected, and detects discrepancies based upon the comparison.

3. The storage area network management system as in claim 1, wherein the integrated management mechanism obtains information on access relationships as the access route information, from the host computer storage area network management mechanism, switches and/or the storage devices, and checks compatibility of the access route information and, if the integrated management mechanism finds any access routes which are not set up correctly, sends a notice about problems in a section corresponding thereto.

4. Host computers in a storage area network system (SAN) including storage devices and switches interconnecting the storage devices and the host computers, each host computer comprising:

an integrated management mechanism to integrate and manage the SAN according to a process comprising:
obtaining access route information of the host computers and the storage devices;
setting up a storage affinity for each host, a switch zoning affinity for each switch, and a host affinity for each storage device, as a SAN configuration setting information based on said obtained access route information;
transmitting access management information to the storage devices and to storage area network management mechanisms of the host computers, based upon the set storage affinity for a host computer;
transmitting region information to region-setting mechanisms of the switches, based upon the set switch zoning affinity; and
transmitting access limit information concerning the host computers to storage management mechanisms of the storage devices, based upon the set host affinity for a storage device.

5. A switch in a storage area network system (SAN) including storage devices, host computers, and an integrated management mechanism integrating and managing the SAN, said switch comprising:

a region-setting mechanism carrying out storage device region access path settings, according to a process comprising:
receiving storage device region access path information, from the integrated management mechanism, and
setting access path information to a storage device region, based on the storage device region access path settings received from the integrated management mechanism, wherein said switch communicatively interconnects the storage devices and the host computers according to the setting of the access path information according to the integrated management mechanism.

6. A storage device in a storage area network system (SAN) including host computers and switches that interconnect the host computers and the storage device, and an integrated management mechanism integrating and managing the storage area network system, said storage device comprising:

a storage management mechanism to establish conditions of access restrictions for the storage device according to a process comprising:
receiving storage device access restriction information, from the integrated management mechanism, and
establishing an access restriction condition to the storage device based on the storage device access restriction information transmitted by the integrated management mechanism.

7. An apparatus provided in a storage area network (SAN) including storage devices including storage management mechanisms, host computers including storage area network management mechanisms, and switches having a region setting mechanism and interconnecting the storage devices and the host computers, said apparatus comprising:

an integrated management mechanism to integrate and manage the SAN according to a process comprising:
obtaining access route information of the host computers and the storage devices;
setting up a storage affinity for each host, a switch zoning affinity for each switch, and a host affinity for each storage device, as a SAN configuration setting information based on said obtained access route information;
transmitting access management information to the storage devices and to the storage area network management mechanisms of the host computers, based upon the set storage affinity for a host computer;
transmitting region information to the switch region-setting mechanism of the switches based upon the set switch zoning affinity, and
transmitting access restriction information concerning the host computers to the storage management mechanisms of the storage devices, based upon the set host affinity for a storage device,
wherein the integrated management mechanism transmits any combination of the one or more of the access management, region information, or access limit information.

8. A computer-readable medium including a program which program, when executed by a computer, causes the computer to execute the processes comprising:

integrating, managing, and controlling access relationships in a storage area network (SAN) including host computers and storage devices connected by switches, each switch having a region setting mechanism, through fiber channels, said processes further comprising:
obtaining access route information of the host computers and the storage devices;
setting up a storage affinity for each host, a switch zoning affinity for each switch, and a host affinity for each storage device, as a SAN configuration setting information based on said obtained access route information, transmitting access management information to the storage devices and storage area network management mechanisms of the host computers based upon the set storage affinity for a host computer, transmitting region information to the region setting mechanisms of the switches, based upon the set switch zoning affinity, and transmitting access restriction information about the host computers to storage management mechanisms of the storage devices based upon the set host affinity for a storage device.

9. A storage area network (SAN) system comprising:

computers as hosts comprising a storage area network management mechanism;

storage devices, each comprising a storage management mechanism;

switches interconnecting the computers and the storage devices, each of the switches comprising a region-setting mechanism; and an integrated management device to integrated and manage said according to a process comprising:

obtaining access path information of the host computers and the storage devices, setting up a storage affinity for each host, a switch zoning affinity for each switch, and a host affinity for each storage device, as a SAN configuration setting information based on said obtained access path information, transmitting access management information to the storage area network management mechanism of the host computers and to the storage devices, based upon the set storage affinity for a host computer, transmitting region information to the region setting mechanisms of the switches, based upon the set switch zoning affinity, transmitting access restriction information about the host computers to the storage management mechanisms of the storage devices, based upon the set host affinity for a storage device, detecting whether fiber channel adapters mounted on the storage devices and the host computers, the host bus adapters mounted on the host computers, or the switches in said storage area network management system are replaced, obtaining settings information following the replacement from the storage area network management mechanism of the host computers, the switch region-setting mechanism or the storage device storage management mechanism, and reconfiguring the access paths to be equivalent to the access paths to the replacement.

10. The storage area network system as in claim 9, wherein when the host bus adapter of the host computer fails and is replaced, the integrated management mechanism detects the replacement of the host bus adapter and notifies a system administrator, wherein upon receipt of a reconfigure command from the system administrator, the integrated management mechanism passes along settings information from the new, replacement host bus adapter in the storage area network management mechanism of the host computer, and, using said new settings information, the integrated management mechanism configures the access paths to be equivalent to the access paths prior to the replacement of the host bus adapter and reconfigures the access paths of the storage area network management mechanism, the region-setting mechanism, and the storage management mechanism.

11. The storage area network system as in claim 9, wherein when the host computer fails and is replaced, the integrated management mechanism detects that the storage area network management mechanism of the host computer has no settings and notifies a system administrator, and upon receipt of a system administrator reconfigure command which passes along to the integrated management mechanism settings information of the connected host bus adapter, the integrated management mechanism uses settings information to reconfigure the access paths to be equivalent to the access paths prior to the host computer replacement and then re-establishes the access paths of the region-setting mechanism and the storage management mechanism.

12. The storage area network system as in claim 9, wherein when a switch fails and is replaced, the integrated management mechanism detects that region settings information set up in the switch is not present and notifies a system administrator, and upon receipt of a reconfigure command from the system administrator, said reconfigure command sets the access paths prior to the replacement in the new switch and reconfigures the access paths.

13. The storage area network system as in claim 9, wherein when a switch fails and is replaced, the integrated management mechanism detects that region settings information set up in the switch is not present and the integrated management mechanism automatically sets up the access routes prior to the failure in the new switch and then reconfigures the access routes.

14. The storage area network system as in claim 9, wherein when the storage device side fiber channel adapter is replaced and the fiber channel adapter settings information is changed, the integrated management mechanism detects this and notifies a system administrator, and upon receipt of a reconfigure command from the system administrator, the storage management mechanism passes along new settings information to the integrated management mechanism and the integrated management mechanism uses that new settings information to reconfigure the access paths so that the access paths are equivalent to the access paths prior to the replacement and then re-configures the access paths of the storage area network management mechanism and the region management mechanism.

15. A storage area network (SAN) system comprising:

host computers, each comprising a storage area network management mechanism;

storage devices, each comprising a storage management mechanism;

switches, each having a region setting mechanism, interconnecting the host computers and the storage devices; and an integrated management mechanism to integrate and control the SAN according to a process comprising:

obtaining access path information of the host computers and the storage devices, setting up a storage affinity for each host, a switch zoning affinity for each switch, and a host affinity for each storage device, as a SAN configuration setting information based on said obtained access path information, transmitting access management information to the storage devices and to the storage area network management mechanism of the host computers, based upon the set storage affinity for a host computer, transmitting region information to the region-setting mechanisms of the switches, based upon the set switch zoning affinity, transmitting access restriction information concerning the host computers to the storage management mechanisms of the storage devices, based upon the set host affinity for a storage device, wherein when the SAN is started up and the access path information has not been set up, the integrated management mechanism first sets up the region-setting mechanisms of the switches so that no access is permitted and, after that, the integrated management mechanism sets up regions on the regions setting mechanisms of the switches.

16. A storage area network (SAN) system comprising:

host computers, each comprising a storage area network management mechanism;

storage devices, each comprising a storage management mechanism;

switches, each having a region setting mechanism, interconnecting the host computers and the storage devices; and an integrated management mechanism to integrate and control the according to a process comprising:

obtaining access path information of the host computers and the storage devices, setting up a storage affinity for each host, a switch zoning affinity for each switch, and a host affinity for each storage device, as a SAN configuration setting information based on said obtained access path information, transmitting access management information to the storage devices and to the storage area network management mechanisms of the host computers, based upon the set storage affinity for a host computer, transmitting region information to the region-setting mechanisms of the switches, based upon the set switch zoning affinity, transmitting access restriction information concerning the host computers to the storage management mechanisms of the storage devices, establishing specified fiber channel transfer classes using the storage area network management mechanism of the host computers whose access information has been set up, and the storage management mechanism of the storage devices, such that host bus adapters of the host computers and the fiber channel adapters of the storage devices operate using same transfer class.

17. A storage area network (SAN) system comprising:

host computers, each comprising a storage area network management mechanism;

storage devices, each comprising a storage management mechanism;

switches, each having a region setting mechanism, interconnecting the host computers and the storage devices; and an integrated management mechanism to integrate and control the SAN according to a process comprising:

obtaining access path information of the host computers and the storage devices, setting up a storage affinity for each host, a switch zoning affinity for each switch, and a host affinity for each storage device, as a SAN configuration setting information based on said obtained access path information, transmitting access management information to the storage devices and to the storage area network management mechanisms of the host computers, based upon the set storage affinity for a host computer, transmitting region information to the region-setting mechanisms of the switches, based upon the set switch zoning affinity, and transmitting access restriction information concerning the above host computers to the storage management mechanisms of the storage devices, based upon the set host affinity for a storage device, wherein when a problem occurs in the SAN, the integrated management mechanism receives problem information and, for a specified period of time, waits to see if there are other problem reports by checking problem reports received during the specified period and investigating relationship between the received problem reports and the problem report received first, and if the integrated management mechanism determines that the received problem reports and the problem report first received are related, the integrated management mechanism transmits a single report concerning one affected area according to a problem report method definition set up in advance in the integrated management mechanism.

18. The storage area network system as in claim 17, wherein the storage area network system presents related problem reports that the storage area network system receives as related problems in addition to the single problem area.

19. The storage area network system as in claim 17, wherein in addition to the access path information, the integrated management mechanism also obtains and stores host-side logical volume information used in the access paths from the storage area network management mechanisms of the host computers, and wherein when there is a report of a problem from within the storage area network, said access paths are used to read in the logical volume based on the access path information using said problem area, and report on the logical volumes that are affected by the problem.

20. A method of integrating and controlling a storage area network (SAN) system, comprising:

providing an integrated, manager to manage access relationships, which comprises access management information, region information, or access limit information, between host computers of the SAN and storage devices of the SAN, wherein a switch connects the host computers and the storage devices;

obtaining by the integrated manager access route information of the host computers and the storage devices;

setting, by the integrated manager, a storage affinity for each host, a switch zoning affinity for each switch, and a host affinity for each storage device, as a SAN configuration setting information based on said obtained access route information;

transmitting, by the integrated manager, the access management information to the storage devices and to the host computers, based upon the set storage affinity for a host computer;

transmitting, by the integrated manager, the region information to the switches, based upon the set switch zoning affinity; and transmitting, by the integrated manager, the access limit information concerning the host computers to the storage devices, based upon the set host affinity for a storage device.

21. The method according to claim 20, wherein the access relationships comprises establishing access paths between the host computers and the storage devices, said access paths being established and controlled by the integrated manager.

22. The method according to claim 21, wherein the access paths control access to regions of the storage devices by the host computers.

23. The method according to claim 20, further comprises, integrating, by the integrated manager, related problems into a single problem report.

24. The method of claim 20, wherein the access relationships comprise any combinations of one or more of the access management information for the storage devices and for the host computers, the region information for the switch, or the access restriction information for the host computers and for the storage devices.

* * * * *

UNITED STATES PATENT AND TRADEMARK OFFICE
CERTIFICATE OF CORRECTION

PATENT NO.       : 7,103,653 B2
APPLICATION NO.  : 09/779844
DATED            : September 5, 2006
INVENTOR(S)      : Sawao Iwatani It is certified that error appears in the above-identified patent and that said Letters Patent is hereby corrected as shown below:

First Page Column 2 (Other Publications), Line 1, change "Proposal:" to --Proposal;--.

Column 19, Line 48, after "mechanism" insert --,--.

Column 20, Line 40, change "re-configures" to --reconfigures--.

Column 21, Line 67, after "affinity," delete "and".

Signed and Sealed this

Thirteenth Day of February, 2007

JON W. DUDAS
*Director of the United States Patent and Trademark Office*